(12) United States Patent
Filatoff

(10) Patent No.: US 10,430,832 B2
(45) Date of Patent: *Oct. 1, 2019

(54) FACILITY MAPPING AND INTERACTIVE TRACKING

(71) Applicant: Alexey Filatoff, Los Angeles, CA (US)

(72) Inventor: Alexey Filatoff, Los Angeles, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 15/615,544

(22) Filed: Jun. 6, 2017

(65) Prior Publication Data
US 2017/0270565 A1 Sep. 21, 2017

Related U.S. Application Data

(63) Continuation-in-part of application No. 14/621,217, filed on Feb. 15, 2015, now Pat. No. 9,712,980.

(60) Provisional application No. 61/942,988, filed on Feb. 21, 2014.

(51) Int. Cl.
| | |
|---|---|
| H04W 4/04 | (2009.01) |
| H04W 4/02 | (2018.01) |
| G01S 5/02 | (2010.01) |
| G06Q 30/02 | (2012.01) |
| G06F 16/22 | (2019.01) |
| G01S 3/04 | (2006.01) |
| G06F 21/34 | (2013.01) |
| G06F 21/62 | (2013.01) |
| G07C 9/00 | (2006.01) |
| H04W 4/21 | (2018.01) |

(52) U.S. Cl.
CPC .......... *G06Q 30/0261* (2013.01); *G01S 3/046* (2013.01); *G01S 5/0294* (2013.01); *G06F 16/22* (2019.01); *G06F 21/34* (2013.01); *G06F 21/62* (2013.01); *G06Q 30/0267* (2013.01); *G07C 9/00007* (2013.01); *G07C 9/00111* (2013.01); *H04W 4/023* (2013.01); *H04W 4/043* (2013.01); *G06F 2221/2113* (2013.01); *H04W 4/02* (2013.01); *H04W 4/21* (2018.02)

(58) Field of Classification Search
CPC .................... G06Q 30/0261; H04W 4/043
See application file for complete search history.

(56) References Cited

U.S. PATENT DOCUMENTS

| | | | |
|---|---|---|---|
| 2003/0011467 A1* | 1/2003 | Suomela | H04W 4/02 340/7.1 |
| 2008/0127246 A1* | 5/2008 | Sylvain | H04N 21/25435 725/32 |
| 2011/0320256 A1* | 12/2011 | Florucci | H04W 4/02 705/14.33 |

* cited by examiner

Primary Examiner — Lester G Kincaid
Assistant Examiner — Daniel G. Bassett
(74) Attorney, Agent, or Firm — Plager Schack LLP

(57) ABSTRACT

A portable electronic device configured to function as an electronic identifier in a facility, a high security zone, an amusement park, a city, and a hotel, and to display an interactive graphical map of the facility, the high security zone when authorized, the amusement park, the city, and hotel facilities when authorized is disclosed, as well as a facility mapping and visitor tracking system with security zone map views, amusement park map views, and city map views, and a set of facility mapping and visitor tracking processes are disclosed.

9 Claims, 12 Drawing Sheets

FACILITY MAPPING AND INTERACTIVE TRACKING

CLAIM OF BENEFIT TO PRIOR APPLICATIONS

This application is a continuation-in-part (CIP) application of and claims benefit to U.S. Non-Provisional patent application Ser. No. 14/621,217, entitled "Facility Mapping And Interactive Tracking," filed Feb. 12, 2015, which claimed benefit to U.S. Provisional Patent Application 61/942,988, entitled "Portable Electronic Device," filed Feb. 21, 2014. The U.S. Non-Provisional patent application Ser. No. 14/621,217 is incorporated herein by reference.

BACKGROUND

Embodiments of the invention described in this specification relate generally to mapping processes, systems, and portable electronic devices, and more particularly, to specific facility mapping and interaction processes, systems, and portable electronic devices.

People who intend to receive or utilize a service or obtain an item are sometimes presented with a paper ticket that typically includes a magnetic tape or stripe that contains a small and limited amount of information which allows a person holding the ticket to receive or utilize the service or obtain the item in advance of, or contemporaneously with, paying for the service or the item. For example, when entering a parking facility, a person may receive a paper ticket with an entry time encoded on the magnetic stripe, and, when exiting the parking facility, may need to use the paper ticket to pay for an amount of time the person parked a vehicle in the parking facility. Such paper tickets and information-encoded magnetic stripes are limited in usefulness due to the data storage constraints of the magnetic tape. This is problematic for many people who would benefit by having more information about a particular facility. This is also problematic for vendors, merchants, and others who would benefit by being able to present custom information about services and/or items which the vendors, merchants, or others offer at any given location or facility.

Therefore, what is needed is a way to provide enhanced information to a person at a location or facility where the enhanced information includes information about the location or facility as well as information related to services or items offered by vendors, merchants, or others at the location or facility.

BRIEF DESCRIPTION

A portable electronic device configured to function as an electronic identifier in a facility and to display an interactive graphical facility map of the facility, a facility mapping and visitor tracking system, and a set of facility mapping and visitor tracking processes are disclosed.

In some embodiments, the portable electronic device is configured to function as an electronic identifier in a facility and to display an interactive graphical facility map of the facility. In some embodiments, the electronic identifier comprises an electronic parking ticket. In some embodiments, the electronic identifier comprises an electronic security zone access authorization. In some embodiments, the electronic identifier comprises an electronic amusement park pass. In some embodiments, the electronic identifier comprises an electronic city visitor pass. In some embodiments, the electronic identifier comprises an electronic access token. In some embodiments, the portable electronic device is multi-functional for use in facility mapping, visitor tracking, and authenticating access rights. In some embodiments, the portable multifunction device is used as a hotel door lock access device in addition to being a facility mapping and visitor tracking device.

In some embodiments, the facility mapping and visitor tracking system includes a set of wireless communication devices and a set of portable electronic devices configured to function as electronic identifiers in the facility for a set of visitors of the facility. In some embodiments, the facility mapping and visitor tracking system is configured for deployment and use in a parking facility. In some embodiments, the facility mapping and visitor tracking system is configured for deployment and use in a building facility. In some embodiments, the facility mapping and visitor tracking system is configured for deployment and use in a high security facility. In some embodiments, the high security facility comprises a military base with a high security zone. In some embodiments, the facility mapping and visitor tracking system is configured for deployment and use in an amusement park. In some embodiments, the facility mapping and visitor tracking system is configured for deployment and use in a municipality. In some embodiments, the municipality comprises a city and the facility mapping and visitor tracking system is configured for city-wide deployment and use. In some embodiments, the municipality comprises a city and the facility mapping and visitor tracking system is configured for location-specific city deployment and use. In some embodiments, the facility mapping and visitor tracking system is configured for deployment and use in hotel door lock access devices.

In some embodiments, the set of facility mapping and visitor tracking processes includes a user process for obtaining a portable electronic device and then displaying and interacting with an interactive graphical facility map on a display screen of the portable electronic device used by a facility visitor. In some embodiments, the set of facility mapping and visitor tracking processes includes a server process for registering a portable electronic device dispensed to a facility visitor and then displaying an interactive graphical facility map and communicating with the portable electronic device used by the visitor at the facility.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
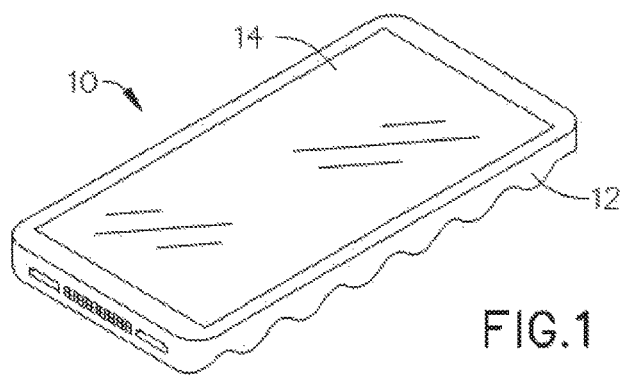
FIG. 1 conceptually illustrates a perspective view of a portable electronic device configured to display an interactive graphical facility map in some embodiments.

In the following detailed description of the invention, numerous details, examples, and embodiments of a facility mapping and tracking system, a facility mapping and tracking process, and a portable electronic device configured to function as an electronic identifier in the facility and to display an interactive graphical facility map of the facility are described. However, it will be clear and apparent to one skilled in the art that the facility mapping and tracking invention is not limited to the embodiments set forth and that the invention can be adapted for any of several applications.

As stated above, many existing facility system use paper tickets with magnetic stripes in order to provide a service or item and/or track information about facility users. For instance, a parking garage may provide paper tickets with magnetic stripes that record entry time and track total parking time of a user by calculating the difference when the user exits the parking garage. However, such paper tickets include only a small and limited amount of information. The data storage constraints of the magnetic tape on a paper ticket limits the usefulness of the paper ticket. Embodiments of the invention described in this specification solve such problems by collecting and analyzing experiences of facility visitors and by delivering facility-based vendor and business advertising content to the facility visitors.

In some embodiments, the portable electronic device is configured to function as an electronic identifier in a facility and to display an interactive graphical facility map of the facility. In some embodiments, the electronic identifier comprises an electronic parking ticket. In some embodiments, the electronic identifier comprises an electronic security zone access authorization. In some embodiments, the electronic identifier comprises an electronic amusement park pass. In some embodiments, the electronic identifier comprises an electronic city visitor pass.

In some embodiments, the electronic identifier comprises an electronic access token. In some embodiments, the portable electronic device is multi-functional for use in facility mapping, visitor tracking, and authenticating access rights. In some embodiments, the portable multifunction device is used as a hotel door lock access device in addition to being a facility mapping and visitor tracking device.

In some embodiments, the facility mapping and visitor tracking system includes a set of wireless communication devices and a set of portable electronic devices configured to function as electronic identifiers in the facility for a set of visitors of the facility. In some embodiments, the facility mapping and visitor tracking system is configured for deployment and use in a parking facility. In some embodiments, the facility mapping and visitor tracking system is configured for deployment and use in a building facility. In some embodiments, the facility mapping and visitor tracking system is configured for deployment and use in a high security facility. In some embodiments, the high security facility comprises a military base with a high security zone. In some embodiments, the facility mapping and visitor tracking system is configured for deployment and use in an amusement park. In some embodiments, the facility mapping and visitor tracking system is configured for deployment and use in a municipality. In some embodiments, the municipality comprises a city and the facility mapping and visitor tracking system is configured for city-wide deployment and use. In some embodiments, the municipality comprises a city and the facility mapping and visitor tracking system is configured for location-specific city deployment and use. In some embodiments, the facility mapping and visitor tracking system is configured for deployment and use in hotel door lock access devices.

In some embodiments, the set of facility mapping and visitor tracking processes includes a user process for obtaining a portable electronic device and then displaying and interacting with an interactive graphical facility map on a display screen of the portable electronic device used by a facility visitor. In some embodiments, the set of facility mapping and visitor tracking processes includes a server process for registering a portable electronic device dispensed to a facility visitor and then displaying an interactive graphical facility map and communicating with the portable electronic device used by the visitor at the facility.

Several more detailed embodiments are described below. Section I describes a portable facility mapping and user tracking device. Section II describes a facility mapping and visitor tracking system. Section III describes several facility mapping and visitor tracking processes. Section IV describes several example facility mapping and visitor tracking system deployments. Section V describes a portable multifunction device. Lastly, Section VI describes an electronic system that implements some embodiments of the invention.

I. Portable Facility Mapping and User Tracking Device

In some embodiments, the portable electronic device is configured to function as an electronic identifier in a facility and to display an interactive graphical facility map of the facility. In some embodiments, the electronic identifier comprises an electronic parking ticket.

By way of example, FIGS. 1-4 conceptually illustrate portable electronic devices that are configured to display interactive graphical facility maps. In particular, FIG. 1 conceptually illustrates a perspective view of a portable electronic device 10 configured to display an interactive graphical facility map in some embodiments. As shown in this figure, the portable electronic device 10 includes a uniquely shaped device housing 12 and a display screen 14. While the device housing 12 in this example provides a single shape, a person skilled in the relevant art would understand that many other housing shapes would be possible to house the portable electronic device 10 configured to display an interactive graphical facility map. Similarly, the display screen 14 can be any shape according to the shape of the housing 12 used to house the portable electronic device 10. The display screen 14 of some embodiments is a touch-sensitive display screen which allows a user of the device 10 to interact with the device 10 by finger movements and touch. Examples of finger movements and touch that a user may conduct to interact with the device include swiping a finger across the display screen 14 or touching a surface location on the display screen 14. A person skilled in the relevant art would understand there to be several other types of gesture-based finger movements, touches, and orientations, which allow the user to interact with the device 10.

In some embodiments, the portable electronic device 10 includes a microphone (not shown in FIG. 1) that allows a user of the device 10 to make audible requests and commands which are received by the microphone and translated into machine-readable instructions for the device 10 to handle. For example, a user of a device 10 may request a location of a food vendor while searching for a parking location, and upon receiving the request for the location of the food vendor, the device 10 may direct the user to a parking spot that is nearby the requested food vendor. In some embodiments, the portable electronic device 10 includes one or more speakers (not shown in FIG. 1) through which audible directions and instructions are provided for a user of the device 10 to hear when navigating the facility.

Figure 2:
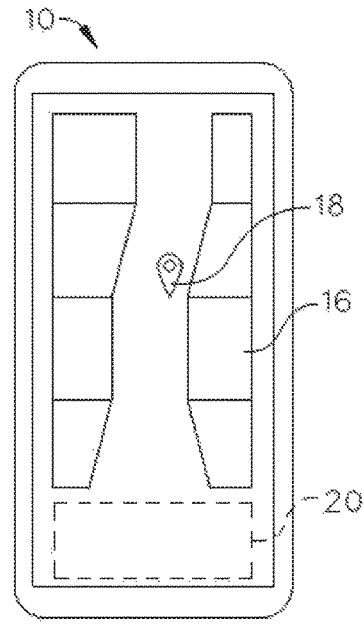
FIG. 2 conceptually illustrates an example of a facility map in a graphical user interface (GUI) displayed on a display screen of a portable electronic device configured to display an interactive graphical facility map in some embodiments.
Figure 3:
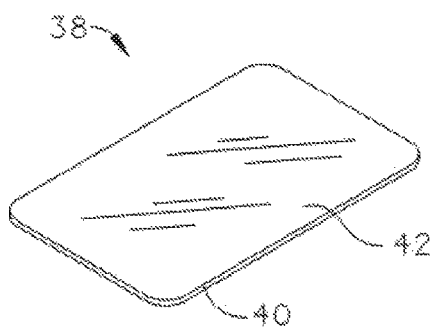
FIG. 3 conceptually illustrates a perspective view of an alternative second portable electronic device configured to display an interactive graphical facility map in some embodiments.

Now turning to FIG. 2, an example of a facility map 16 is conceptually illustrated in a graphical user interface (GUI) displayed on the display screen 14 of the portable electronic device 10 described by reference to FIG. 1. As shown in this figure, the facility map 16 includes a location indicator graphical element 18 and an information display area 20 of the GUI.

In some embodiments, the location indicator graphical element 18 displays a real-time location of a user of the device 10 as the user moves within the facility. In some embodiments, a view of the facility map 16 is updated as the user moves within the facility so that the location indicator graphical element 18 is centered within the view of the facility map 16 being displayed on the display screen 14 of the device 10. In some embodiments, the location indicator graphical element 18 moves within the facility map 16 displayed on the display screen 14 of the device 10. For example, the movement of the location indicator graphical element 18 may mimic the tracked movements of the user of the device 10 within the facility, causing the facility map 16 displayed on the display screen 14 of the device 10 to remain static until or unless the user moves to a location of the facility that maps to a non-displayed position of the facility map 16. In such a scenario, the portable electronic device 10 of some embodiments updates a map display view of the facility map 16 to reposition the location indicator graphical element 18 at the center of the updated map view.

In some embodiments, the information display area 20 is configured to show textual directions to a destination location, such as a parking spot or a particular vendor. For example, a user of the device 10 map request a location of the particular vendor by an audible request (e.g., speaking the name of a vendor in a microphone of the portable electronic device 10) or a textual request (e.g., using a digital or physical keypad to type in a vendor name). In some embodiments, the information display area 20 is configured to display advertisements associated with vendors at the facility. Advertisements can include textual information about products, services, or vendors in general. Advertisements can further include imagery, such as photo images, computer graphics imagery (CGI), and/or video advertisements.

Figure 4:
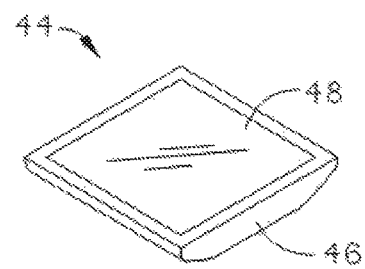
FIG. 4 conceptually illustrates a perspective view of an alternative third portable electronic device configured to display an interactive graphical facility map in some embodiments.

The examples described by reference to FIGS. 1-2 conceptually illustrate one type of portable electronic device 10. However, a person skilled in the relevant art would understand that many other types of portable electronic devices could be configured to display an interactive graphical facility map. By way of example, FIG. 3 conceptually illustrates a perspective view of an alternative second portable electronic device 38 configured to display an interactive graphical facility map in some embodiments. As shown in this figure, the alternate second portable electronic device 38 includes an alternate second device housing 40 and an alternate second device display screen 42. Another example embodiment is shown in FIG. 4, which conceptually illustrates a perspective view of an alternative third portable electronic device 44 configured to display an interactive graphical facility map. The alternate third portable electronic device 44 in this figure includes an alternate third device housing 46 and an alternate third device display screen 48.

While the descriptions of the portable electronic devices illustrated in FIGS. 1-4, present general examples of facility mapping, user tracking, and advertising, some specific systems which utilize portable electronic devices are described in the next section.

II. Facility Mapping and Visitor Tracking System

In some embodiments, the facility mapping and visitor tracking system includes a set of wireless communication devices and a set of portable electronic devices configured to function as electronic identifiers in the facility for a set of users at the facility. Examples of users at the facility include, without limitation, visitors of the facility, workers engaged in work at the facility, and security officials and peace officers at the facility. In some embodiments, the facility mapping and tracking system utilizes real-time location information of the portable electronic devices to provide mappable data to the portable electronic devices in relation to the real-time location information for the display of interactive graphical facility maps.

In some embodiments, the facility mapping and visitor tracking system is configured for deployment and use in a parking facility. In some embodiments, the facility mapping and visitor tracking system is configured for deployment and use in a building facility. In some embodiments, the facility mapping and visitor tracking system is configured for deployment and use in a high security facility. In some embodiments, the high security facility comprises a military base with a high security zone. In some embodiments, the facility mapping and visitor tracking system is configured for deployment and use in an amusement park. In some embodiments, the facility mapping and visitor tracking system is configured for deployment and use in a municipality. In some embodiments, the municipality comprises a city and the facility mapping and visitor tracking system is configured for city-wide deployment and use. In some embodiments, the municipality comprises a city and the facility mapping and visitor tracking system is configured for location-specific city deployment and use. In some embodiments, the facility mapping and visitor tracking system is configured for deployment and use in hotel door lock access devices.

Figure 5:
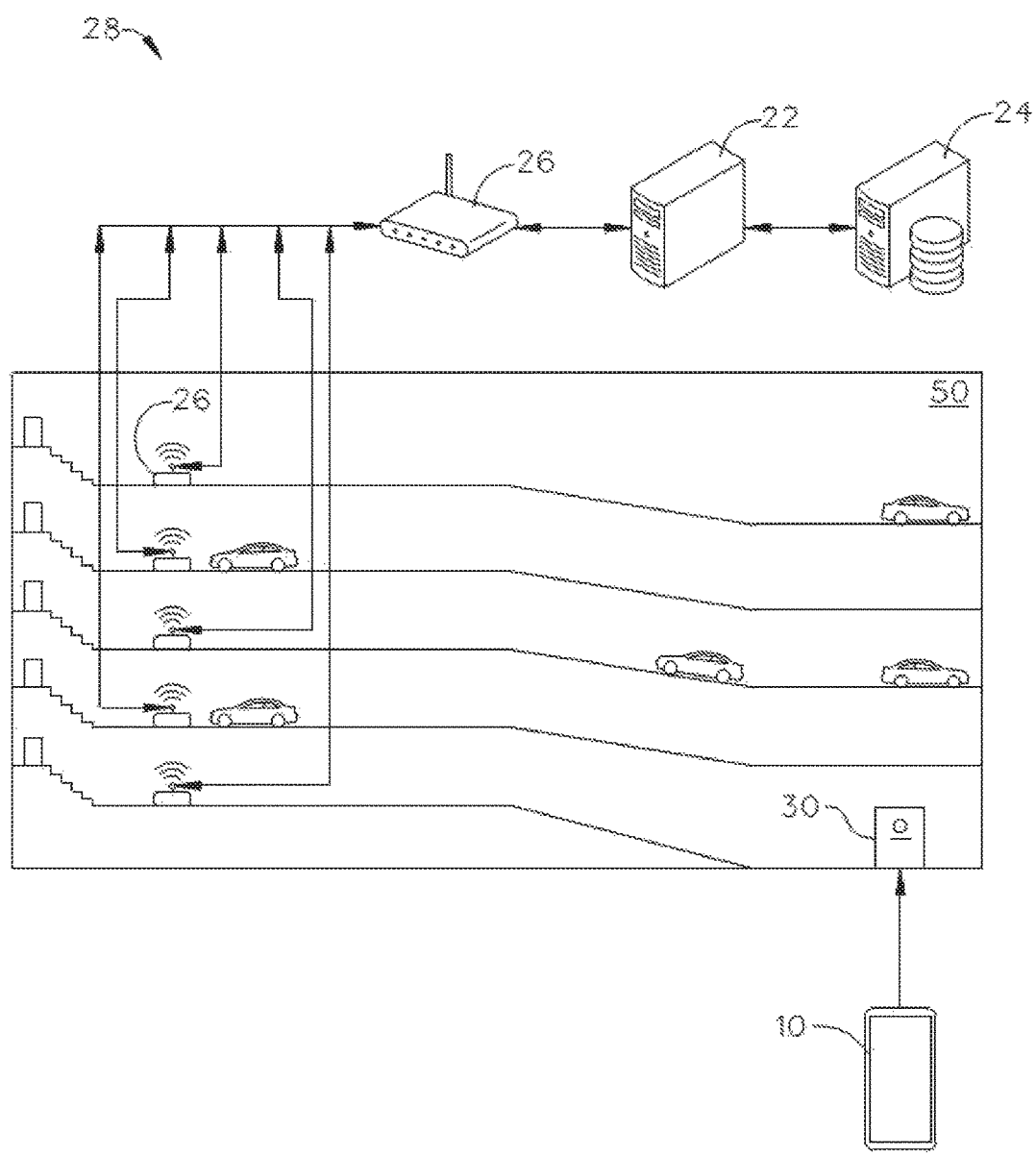
FIG. 5 conceptually illustrates a schematic view of a graphical facility map generating system used in a parking facility in some embodiments.

By way of example, FIG. 5 conceptually illustrates a schematic view of a facility mapping and tracking system 28 implemented for use in a parking facility 50. As shown in this figure, the facility mapping and tracking system 28 includes a server computing device 22, a database server computing device 24, a set of wireless routers 26, and a device dispense unit 30 that dispenses devices such as portable electronic device 10. A visitor to the parking facility 50 receives a portable electronic device 10 upon entry into the parking facility 50. An electronic time stamp is generated at the entry time and stored on the portable electronic device 10. As the visitor drives a vehicle throughout the parking facility 50, the portable electronic device 10 transmits its location to one or more of the wireless routers 26, which forward the location data to the server computing device 22. The server computing device 22 then generates mappable data to transmit back to the portable electronic device 10, so that the portable electronic device 10 can generate and display a map of the facility with the current location of the visitor displayed on the map. Also, the server computing device 22 retrieves advertising information related to the current location of the visitor from the database 24. In some embodiments, the server 22 retrieves images, CGI, text, and/or video data from the database 24 and transmits the data to the portable electronic device 10 for display in the advertising area 20 of the GUI showing the facility map 16 on the display screen 14 of the portable electronic device 10.

Five parking levels are included in this example parking facility 50. As shown, each level of the parking facility 50 includes a wireless router 26. Thus, when a visitor's car moves from a lower level to an upper level, the wireless router 26 at the upper level transmits data to the server 22 indicating that the visitor identified by the portable electronic device 10 is on the upper level. In that regard, the server 22 retrieves the updated views for the parking facility and transmits the views to the portable electronic device 10. Similarly, the server 22 retrieves updated advertising data from the database 24 and transmits the advertising data to the portable electronic device 10.

For example, when a visitor enters the parking facility 50 on the first level, the visitor obtains a portable electronic device 10 from the device dispenser 30. As the visitor drives a vehicle from the first level to the second level of the parking facility 50, the wireless router 26 on the second level transmits the visitor's location to the server 22 and receives the updated map views and advertising from the server 22 (to thereafter transmit back to the portable electronic device 10 of the visitor). Since different levels of the parking facility 50 may be closer to certain commercial entities than other levels of the parking facility, the server 22 only retrieves the advertising information from the database 24 which is relevant to the commercial entities at each particular level of the parking facility 50. In some embodiments, the commercial entities include stores and commercial entities established in a facility that is proximate to the parking facility. For example, certain stores of a mall may be present on a first level while other stores in the mall are present on the second level. In such a scenario, the portable electronic device 10 may retrieve advertising for the stores on the first level when the visitor is on the first level of the parking facility 50, and then retrieve advertising for stores on the second level when or if the visitor moves up to the second level. In some embodiments, commercial entities pay to sponsor one or more levels of the parking facility 50. When a particular commercial entity pays to sponsor a parking facility level 50, the portable electronic device 10 of some embodiments retrieves advertising related the particular commercial entity from the database 24. In all cases, the portable electronic device 10 of the visitor retrieves real-time map updates, regardless of the manner in which advertising of commercial entities is provided. In this way, the visitor gets real-time map updates based on the current location of the portable electronic device 10 as the visitor drives through the parking facility 50 and also receives advertising that is either (i) relevant to the particular level on which the vehicle of the visitor is presently located or (ii) preferred according to some preferential treatment of one or more particular commercial entities (e.g., such as those commercial entities which pay to sponsor levels of the parking facility 50).

The facility mapping and tracking system 28 differs from and improves upon currently existing magnetic stripe-based paper ticket systems. In particular, some embodiments of the facility mapping and tracking system differ because in current systems, a parking ticket is a piece of paper with magnetic tape which contains very limited information and can be used only to pay for the parking and to exit the shopping mall or any other business facility parking structure. In contrast, the portable electronic device 10 described in this document provides an ability for a facility to collect and analyze every visitor experience and at the same time to provide convenient way for businesses and vendors proximate to the facility (any facility, including a parking facility, an amusement park or other park with attractions, etc.) to deliver advertising content to the visitors.

Figure 6:
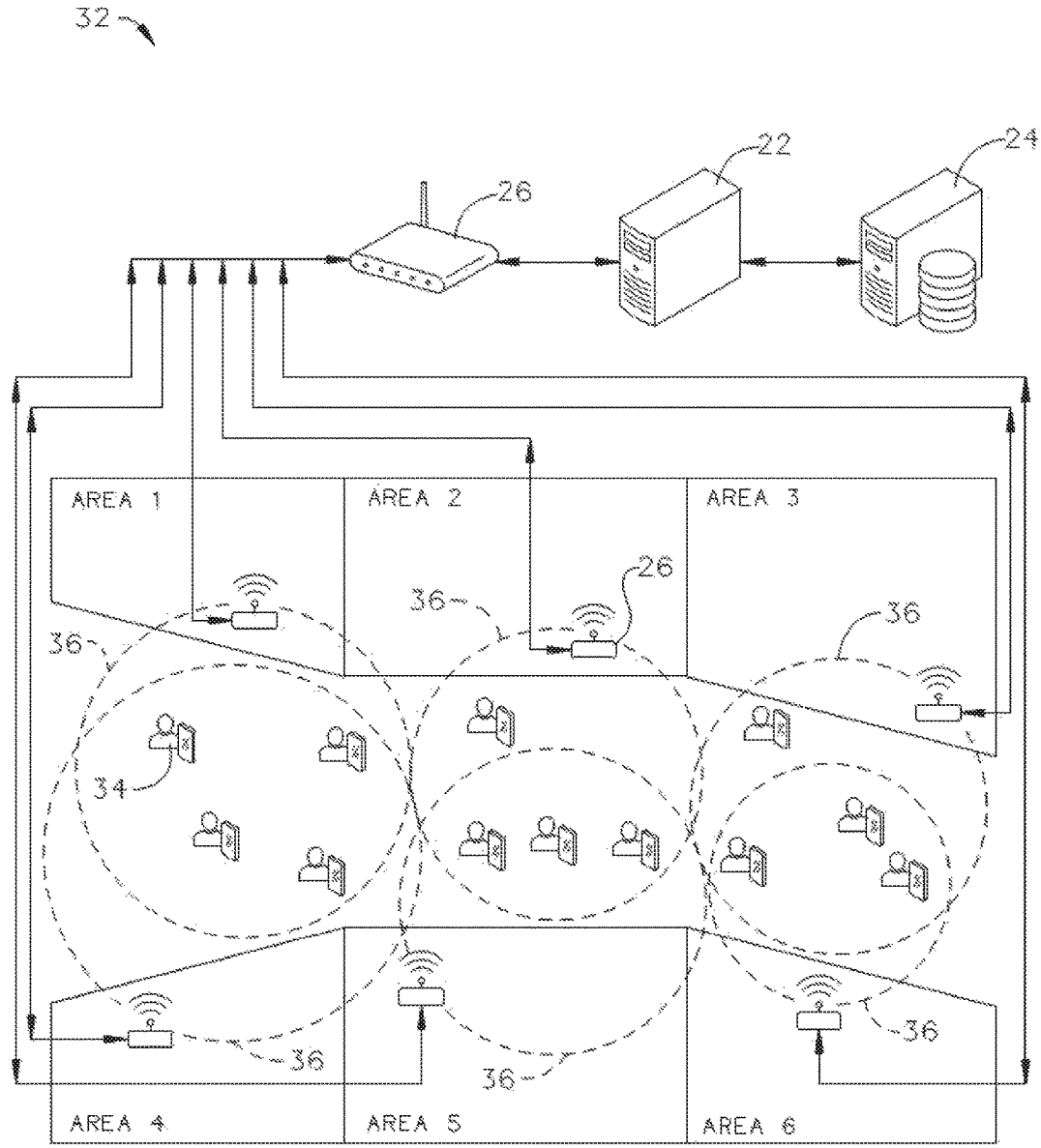
FIG. 6 conceptually illustrates a schematic view of a facility map generating system used in a building facility in some embodiments.

While the facility mapping and tracking system 28 described by reference to FIG. 5 is implemented for a parking facility 50, in some embodiments, a facility mapping and tracking system is implemented for other types of facilities. For example, FIG. 6 conceptually illustrates a schematic view of a facility mapping and tracking system 32 used in a building facility 52. As shown in this figure, the facility mapping and tracking system 32 includes the server computing device 22, the database server computing device 24, a set of wireless routers 26, and a set of areas 36. Each area 36 is associated with a wireless range of one of the wireless routers 26. In some facility locations, a facility visitor 34 can be present at a location within the wireless range of two or more wireless routers 26. When a visitor 34 is in an area 36 or in overlapping areas 36, the portable electronic device 10 used by the visitor 34 transmits location data to the wireless router 26 or routers 26 within wireless communication range (as shown by areas 36). The router(s) 26 transmits the location data to the server 22, which then computes map updates based on the location data and transmits the updated map data to the visitor 34 by way of the router(s) 26. The server 22 also retrieves advertising data from the database 24 and transmits the advertising data to the visitor 34 by way of the router(s) 26. Since the visitor's general location is known by the area(s) 36 associated with the visitor's location, the server can retrieve specific, targeted advertising from the database 24, where the retrieved advertising data relates directly to businesses or vendors proximate to the visitor's present area(s) 36. In this way, a visitor 34 can walk through the facility 52 and get live updates of the facility map while walking, and also receive advertising related to businesses and vendors that are nearby (or being walked toward or past).

To use the facility mapping and tracking system of the present disclosure, one or more computer-implemented processes are performed by a portable multifunction device with a touch screen display and a facility server 22. For example, after receiving the portable multifunction device 10 from parking card dispenser 30, the portable multifunction device 10 receives mappable data from the facility server 22 and displays an interactive map of the facility, while also displaying present, real-time map position indicators while the portable multifunction device 10 is carried by a visitor throughout of the facility. In some cases, the map displays supplementary data useful to the visitor of the facility, including map displays of available parking slots on each level of the parking structure and/or highlighted arrows showing facility routes which a visitor can traverse by car or foot to get to a particular destination related to the facility (e.g., a particular store, a particular open parking spot such as a handicapped parking spot, etc.).

Figure 7:
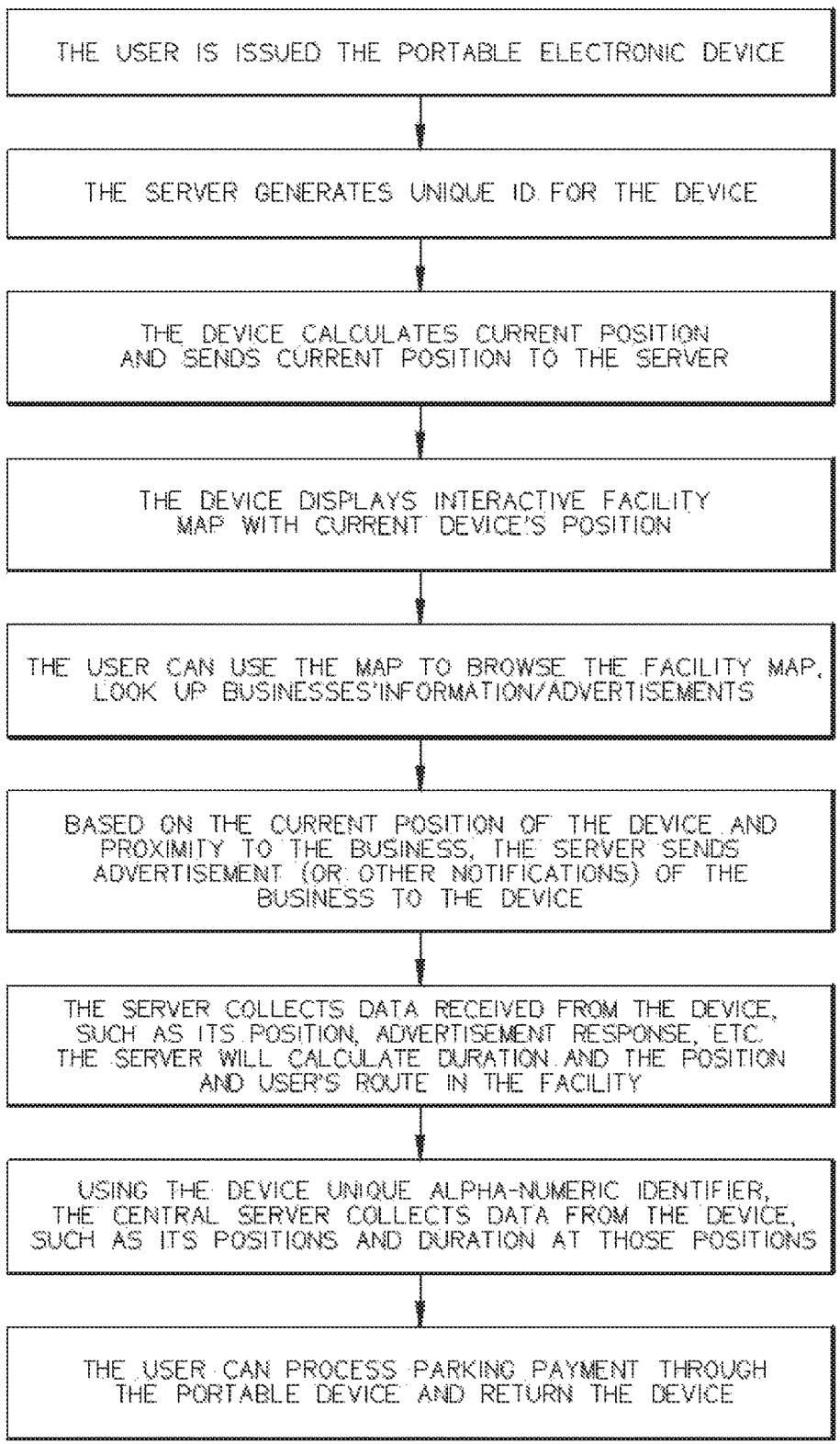
FIG. 7 conceptually illustrates a system process for displaying and interacting with an interactive graphical facility map in some embodiments.

By way of example, FIG. 7 conceptually illustrates a system process 54 for displaying and interacting with an interactive graphical facility map in some embodiments. As shown in this figure, the system process 54 starts when a visitor (i.e., a "user") enters a facility. Upon entering, the user is issued a portable electronic device. As described above, the facility's device dispenser 30 will capture a time of entry and save the entry time on the device when an amount of time at the facility is tracked (e.g., at a parking facility). However, if time is not tracked, the dispenser may issue the portable electronic device without saving any information.

After being issued the portable electronic device, the process 54 proceeds to the next step of the facility server 22 generating a unique ID for the portable electronic device. In some embodiments, each portable electronic device has a unique ID in order to provide accurate facility mapping data in relation to the location of each specific device. In some embodiments, each portable electronic device has a unique ID that is associated with a hardware ID of the portable electronic device, and instead of generating a unique ID for such portable electronic device, the facility server 22 merely receives an "activation" signal from the portable electronic device once the user receives the device from the dispenser. If a unique ID was generated by the server, however, then the portable electronic device stores the unique ID during the duration of use of the portable electronic device by the present user.

Next, the process 54 includes the device calculating a current position of the user and transmitting the current position to the facility server 22 (by way of a nearby wireless router 26). The portable electronic device then receives mappable data from the server. The process 54 then includes steps for the device to display the interactive facility map with the indicator shown on the map to indicate the user's current position. The user can then use the facility map to browse through the facility, look up businesses, parking spots, vendors, bathrooms, food courts, services, and any of several other facility-related things.

Contemporaneously with displaying the facility map for the user to interact with and obtain facility-related location information, the process 54 also includes receiving and displaying advertisements on the portable electronic device. Thus, as the user walks/drives through the facility, the server 22 may retrieve and transmit specific advertisement data related to vendors or businesses proximate to the user's present position.

Additionally, while providing map updates and displaying advertising images and information on the portable electronic device, the server 22 in some embodiments of the facility mapping and tracking system collects data received from the portable electronic device. Examples of such information received from the portable electronic device include position data, movement trend data, advertisement response and/or interaction, etc. In some embodiments, the server calculates the duration of time spent at the facility (when relevant) and collects vendor-specific information, such as time spent in areas proximate to a vendor and/or interactions by the user with advertisements related to a vendor.

Next, the user may deposit the portable electronic device with the dispensing unit upon leaving the facility. In some embodiments, the user pays for parking through the portable device prior to returning the device. Once the device is returned, the process 54 ends.

III. Facility Mapping and Visitor Tracking Processes

In some embodiments, the set of facility mapping and visitor tracking processes includes a user process for obtaining a portable electronic device and then displaying and interacting with an interactive graphical facility map on a display screen of the portable electronic device used by a facility visitor. In some embodiments, the user process includes electronically identifying the facility visitor as a user and displaying a facility map in relation to a location of the identified user in the facility.

Figure 8:
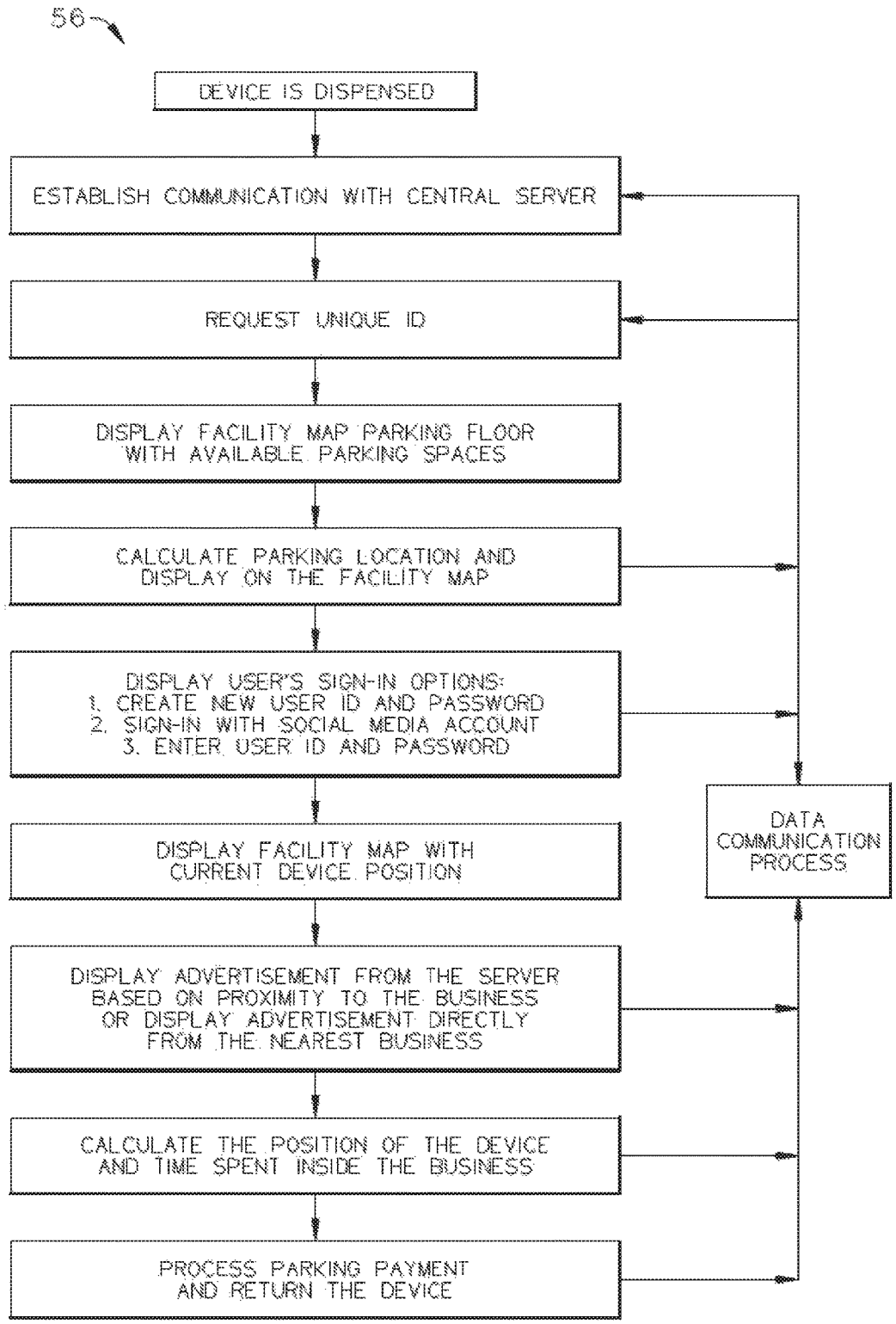
FIG. 8 conceptually illustrates a user process for obtaining a portable electronic device and then displaying and interacting with an interactive graphical facility map on a display screen of the portable electronic device used by a facility visitor in some embodiments.

By way of example, FIG. 8 conceptually illustrates a user process 56 for obtaining a portable electronic device and then displaying and interacting with an interactive graphical facility map on a display screen of the portable electronic device used by a facility visitor. As shown in this figure, the user process 56 includes steps performed by a user of a portable electronic device at a particular facility. However, the user process 56 includes several steps that involve data communication with a server process 58, which is described further below by reference to FIG. 9. Thus, a person skilled in the art would understand that the user process 56 and the server process 58 work together by way of a data communication process. For example, the portable electronic device and the server computing device may communicate wirelessly via a wireless router.

The user process 56 starts when a visitor arrives at a facility and a device is dispensed to the visitor. For example, the visitor may enter a parking garage and obtain a portable electronic device when driving into the garage. The user process 56 then establishes communication with the server (e.g., wireless communication via a wireless router). In some embodiments, the user process 56 receives a set of data from the server indicating that the communication is established. Once communication is established, the user process 56 requests a unique identifier (i.e., "ID" or "UID"). The unique ID is requested by the process 56 because in a typical usage case there may be several or even hundreds (or more) dispensed portable electronic devices being used by visitors. Thus, in order to distinguish one portable electronic device from another portable electronic device, the user process 56 requests a unique ID to use in all communications with the server.

In some embodiments, the user process 56 next displays a facility map. For example, if the visitor entered a parking facility, the user process 56 may display a parking facility map showing parking spaces that are available on each floor of the parking facility. In some embodiments, the parking facility map distinguishes the display of parking spaces which are open for parking and parking spaces which are presently occupied. In some embodiments, the user process 56 also calculates a preferred parking location and displays the parking location on the parking facility map. Next, the user process 56 displays user sign-in options, including (i) an option to create a new user ID and password (for new visitors to the facility, or visitors who do not have a user ID and password), (ii) an option to sign-in with a social media account (e.g., sign-in to an existing facility account using a set of social media account credentials or register a new facility account by signing-in with a set of social media account credentials), and (iii) enter user ID and password.

Once the visitor is logged into the facility account, a set of user account features are activated in relation to using the portable electronic device. First, the user process 56 displays the facility map from the perspective of a current location of the portable electronic device. Next, the user process 56 displays one or more advertisements received from the server. The server transmits the advertisements based on the current location of the portable electronic device. For example, the server may transmit advertisements from two vendors nearby the current location of the portable electronic device, or may transmit an advertisement from the closest vendor only. The advertisements can also be based on identifying features of the user (e.g., known features of the visitor, such as gender or approximate age group). For example, the server may filter out advertisements from a nearby vendor that are intended for a female audience when the user account is understood to be associated with a male visitor, or the server may filter out advertisements from a nearby video game vendor when the user account is understood to belong to an elderly visitor.

In some embodiments, the user process 56 calculates the position of the portable electronic device and any movements of the device. Similarly, the user process 56 of some embodiments calculates durations of time spent in one or more stores/vendors. After the visitor is finished at the facility, the visitor may use the portable electronic device to pay for parking and thereafter returns the device to a dispensing unit. Thus, the user process 56 processes payment for the duration of the parking and adds the returned portable electronic device to the set of devices available to be dispensed to other visitors. The user process 56 then ends.

In some embodiments, the set of facility mapping and visitor tracking processes includes a server process for registering a portable electronic device dispensed to a facility visitor and then displaying an interactive graphical facility map and communicating with the portable electronic device used by the visitor at the facility. In some embodiments, the server process includes electronically identifying the facility visitor as a user, tracking a movement of the user within the facility, mapping a facility location of the user in real-time based on the tracked movement of the user, and updating a facility map view to display for a facility map associated with the identified user based on the mapped, real-time facility location of the user.

Figure 9:
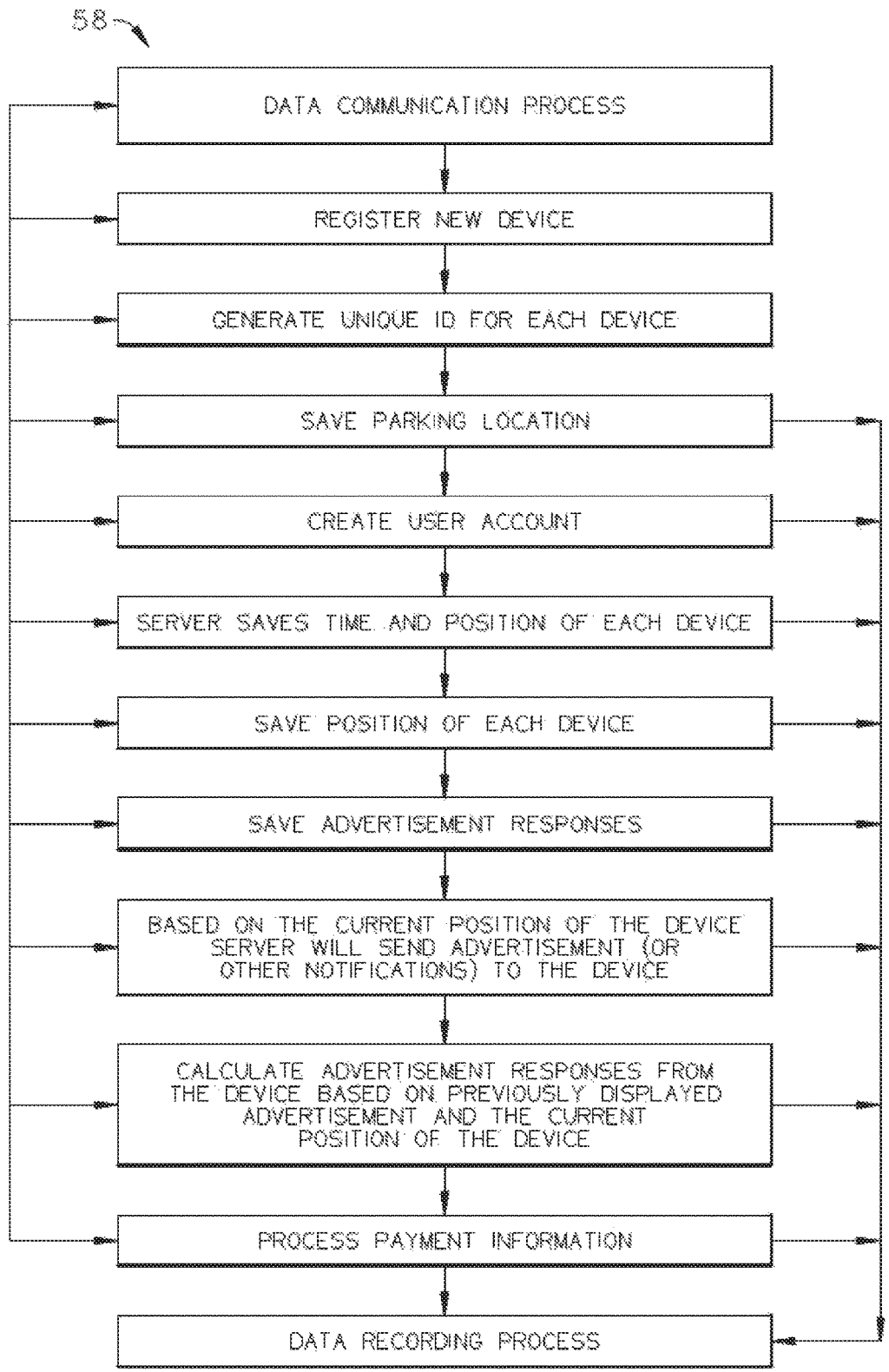
FIG. 9 conceptually illustrates a server process for registering a portable electronic device dispensed to a facility visitor and then generating an interactive graphical facility map and communicating with the portable electronic device used by the visitor at the facility in some embodiments.

By way of example, FIG. 9 conceptually illustrates a server process 58 for registering a portable electronic device dispensed to a facility visitor and then displaying an interactive graphical facility map and communicating with the portable electronic device used by the visitor at the facility. As shown in this figure, the server process 58 includes steps performed by way of a data communication process established with a portable electronic device being used by a visitor of a facility. The server process 58 starts when the portable electronic device being used by the facility visitor establishes communication with the server (e.g., wireless communication via a wireless router). The server process 58 then registers the portable electronic device and generates a unique ID for the portable electronic device.

After initializing the communication between the server and the portable electronic device, and setting up a unique ID to distinguish the portable electronic device from other portable electronic devices being used at the facility, the server process 58 then saves a particular parking location to associate with the portable electronic device (and visitor). In some embodiments, the server process 58 also creates a user account (if not yet established) or receives user account log-in credentials.

Next, the server process 58 saves the time and position of each portable electronic device currently in use. After the position of a portable electronic device is established and saved, if any responses or feedback are received from the portable electronic device in regards to particular advertisements, the server process 58 saves the responses and feedback. In some embodiments, the server process 58 then sends advertisements and notifications (map updates, etc.) to the portable electronic device based on its current location. The server process 58 then calculates advertisement responses from the portable electronic device based on previously displayed advertisement(s) and the current position of the portable electronic device. The server process 58 then processes payment information received from the portable electronic device and begins to save the data associated with a portable electronic device session (i.e., saved in relation to the user's account or the unique ID). The server process 58 then ends.

IV. Facility Mapping and Visitor Tracking System Deployments

Notwithstanding the example deployments of the facility mapping and visitor tracking system described above by reference to FIGS. 5 and 6, several additional deployments, implementations, installations, and uses are possible in relation to the facility mapping and visitor tracking system described in this specification. In this section, therefore, some exemplary deployments, implementations, and use cases are presented to further demonstrate the scope of use which can be made with deployments and implementations of the facility mapping and visitor tracking system.

Figure 10:
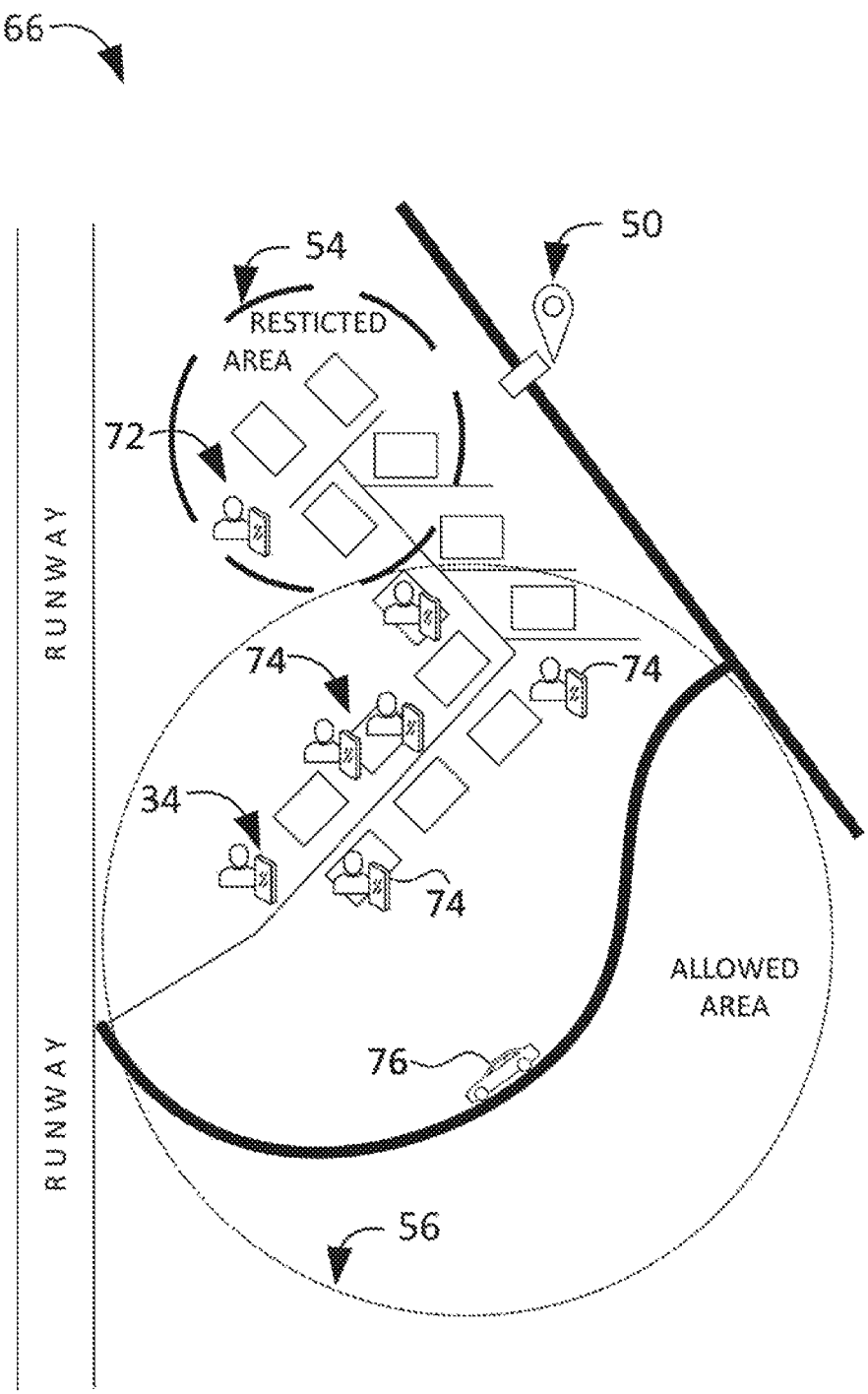
FIG. 10 conceptually illustrates a schematic view of a facility mapping and visitor tracking system in some embodiments that is configured for deployment and use at a military base with a high security zone.

By way of example, FIG. 10 conceptually illustrates a schematic view of a facility mapping and visitor tracking system 66 that is configured for deployment and use at a military base with a high security zone. As shown in this figure, the military base facility mapping and visitor tracking system 66 includes a restricted area 54 and an allowed area 56. While not shown in this figure, the military base facility mapping and tracking system 66 also includes a server computing device (such as the server computing device 22 described above by reference to FIG. 6), a database server computing device (such as the database server computing device 24 described above by reference to FIG. 6), and a set of wireless routers (such as the set of wireless routers 26 described above by reference to FIG. 6). Each area of the military base facility mapping and visitor tracking system 66 (i.e., the restricted area 54 and the allowed area 56) is associated with a wireless range of at least one of the wireless routers (not shown).

The allowed area 56 is an area in which general military personnel can obtain map information of the military base, and visitors can even obtain limited map information of the military base within the allowed area 56. The restricted area 54 is an example of a high security zone at the military base in which the military base facility mapping and visitor tracking system 66 is deployed. As shown in this figure, an authorized military user 72 is present in the restricted area 54. In some embodiments, the authorized military user 72 is able to obtain map information of installations or locations within the restricted area 54. The authorized military user 72 may use a device with security clearance based on device authentication, thereby ensuring that only properly credentialed and authorized personnel are able to retrieve facility map information in the high security zones, such as the restricted area 54.

In contrast, a facility visitor 34 is present in the allowed area 56, as well as several general military users 74. A motor vehicle 76 is shown driving in the allowed area 56. The driver of the motor vehicle 76 would be able to use his or her the portable electronic device to obtain some map and location information in the allowed area 56, whether the driver is a facility visitor 34 entering from a military base entry point 50 (and being dispensed the portable electronic device at the entry point 50), a general military user 74 driving between military base (and either having an existing issued portable electronic device already and driving between locations on the military base or being dispensed the portable electronic device at the entry point 50 when driving between different military bases at different locations), or an authorized military user 72 heading toward the restricted area 54 (with an existing issued portable electronic device or a portable electronic device dispensed at the entry point 50).

Figure 11:
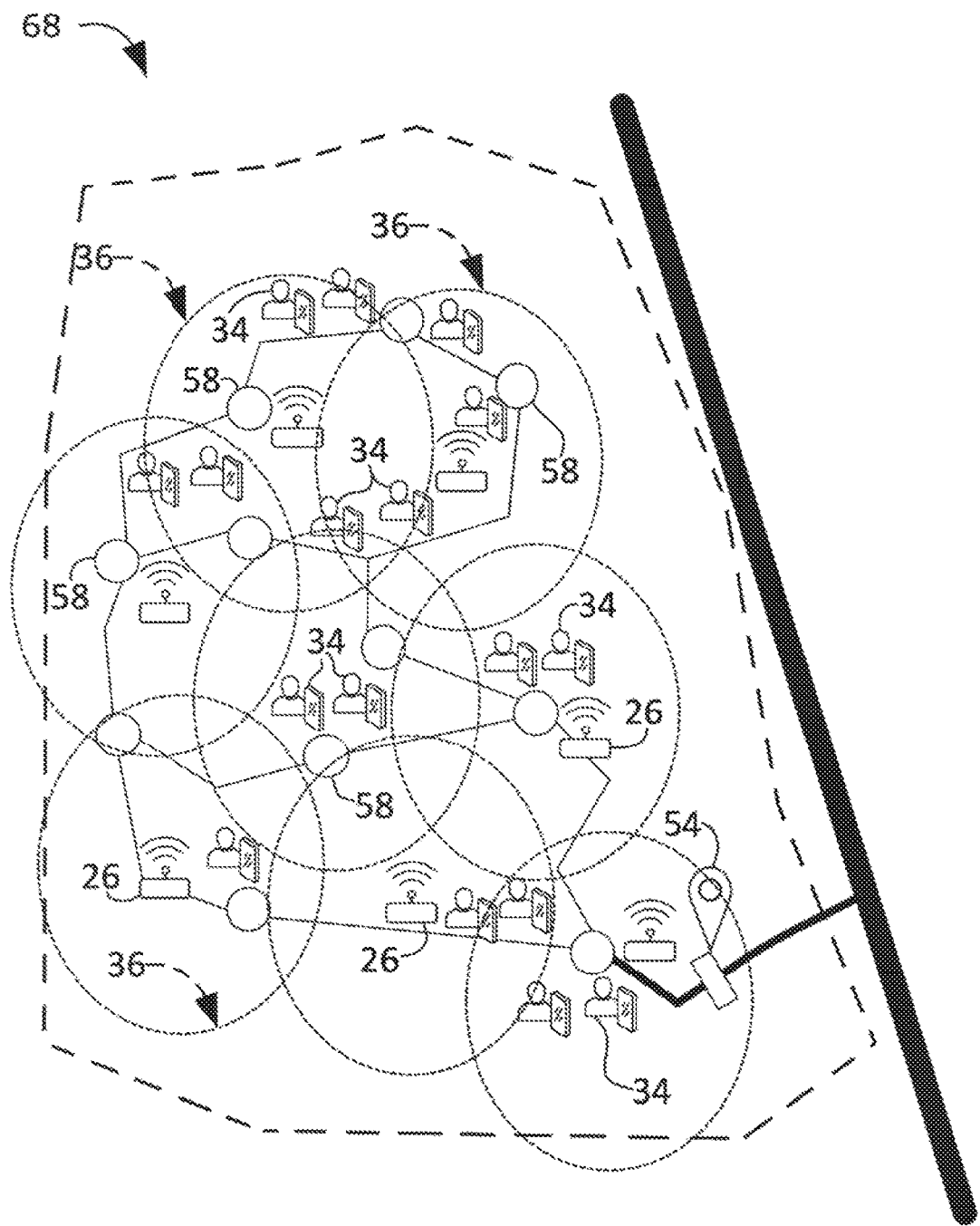
FIG. 11 conceptually illustrates a schematic view of a facility mapping and visitor tracking system in some embodiments that is configured for deployment and use at an amusement park.

Turning to another example, FIG. 11 conceptually illustrates a schematic view of a facility mapping and visitor tracking system 68 that is configured for deployment and use at an amusement park. As shown in this figure, the amusement park facility mapping and visitor tracking system 68 includes several areas 36, several wireless routers 26 (one wireless router 26 for each area 36), several park attractions 58, and an amusement park entry/exit point 54 (hereinafter referred to as any of "entry point", "entrance", "exit point", "exit", or "entry/exit point"). While not shown in this figure, the amusement park facility mapping and tracking system 68 also includes a server computing device (such as the server computing device 22 described above by reference to FIG. 6) and a database server computing device (such as the database server computing device 24 described above by reference to FIG. 6).

Several facility visitors 34 are present in the amusement park. The facility visitors 34 can enter the entry point 54 shown in this figure. Each facility visitor 34 is dispensed a portable electronic device at the entry point 54, thereby enabling the visitors to obtain amusement part information and map information for getting around the amusement part, as well as advertisements from vendors stationed throughout the amusement park. For the sake of clarity, the amusement park facility mapping and visitor tracking system 68 shows only one entry point 50 through which facility visitors 34 can enter the amusement park (and be dispensed a portable electronic device) or leave the amusement park (and return the portable electronic device). However, it should be understood that the amusement park in this example is merely a conceptual example, and that the amusement park facility mapping and visitor tracking system 68 can have multiple entry/exit points 54, and each entry point 54 (exit point) can have multiple portable electronic device dispensers for facility visitors to obtain a portable electronic device while entering the park and/or to return the portable electronic device when exiting the amusement park. Also, in some embodiments, the dispensing unit at which a facility visitor is dispensed a portable electronic device when entering the park can be the same unit which the facility visitor returns the portable electronic device upon leaving the park. Alternatively, the facility visitor can be dispensed a portable electronic device from one dispensing unit and return the portable electronic device to a different dispensing unit when exiting the amusement park (e.g., entering from one entry point and existing through a different point).

Each facility visitor 34 can use the portable electronic device in the amusement park to obtain real-time map information of the park as they walk from one location to another location within the park. Within the amusement park, the facility visitors 34 encounter any of several park attractions 58. In some embodiments, the amusement park facility mapping and visitor tracking system 68 promotes various park attractions 58 which are in the wireless range of their present location in the park. Information, images, and/or videos may be displayed on the portable electronic device of a facility visitor 34 for one or more park attractions that may be present within the wireless range at which the facility visitor 34 is present. In some embodiments, when the facility visitor 34 is present in overlapping wireless ranges of different areas 36, the park attractions 58 for each area 34 may be promoted on the portable electronic device of the facility visitor 34. In some other embodiments, when the facility visitor 34 is present in overlapping wireless ranges of different areas 36, the park attractions 58 for a single area 34 may be promoted based on a direction in which the facility visitor is traveling. For example, if the facility visitor is walking toward the edge of a first wireless area but is nearing the heart of a second wireless area, the amusement park facility mapping and visitor tracking system 68 may promote more park attractions 58 in the second wireless area even when the facility visitor is present in the overlapping wireless range of both the first and second wireless areas.

In some embodiments, the park attractions 58 are stationary in their respective locations. Examples of stationary park attractions include, without limitation, amusement park rides, games, performances, exhibitions, information booths, healthcare/emergency facilities, bathrooms, restaurants, gift vendors, snack vendors, drink vendors, special promotions booths or stands, etc. In some embodiments, some of the park attractions are non-stationary, mobile park attractions. Examples of non-stationary, mobile park attractions include, without limitation, mobile vendor carts, costumed park mascots and fictional characters (e.g., live humans walking the park in costumes or other attire), parades, etc.

Figure 12:
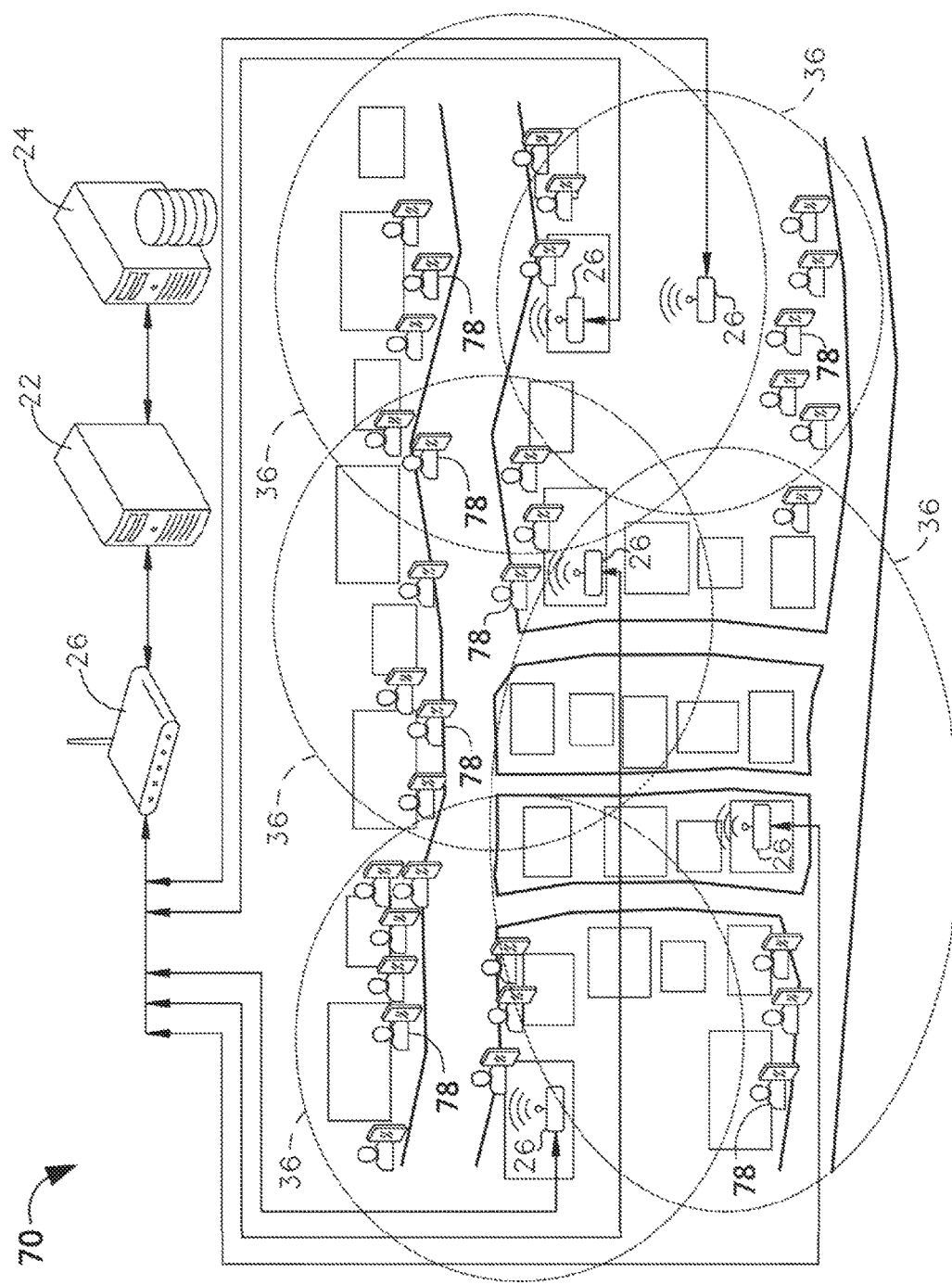
FIG. 12 conceptually illustrates a schematic view of a facility mapping and visitor tracking system in some embodiments that is configured for deployment and use in a city.

Now turning to another example, FIG. 12 conceptually illustrates a schematic view of a facility mapping and visitor tracking system 70 that is configured for deployment and use in a city by city users 78. Examples of city users 78 include, without limitation, visitors to a city (e.g., tourists interested in seeing the sights of a city, visitors to an entertainment destination, such as Las Vegas or Orlando, conference attendees congregating in a particular city hosting a specific conference, etc.). Portable electronic devices can be distributed to the city users 78 in any of several manners in relation to the city-based facility mapping and visitor tracking system 70. In some embodiments, portable electronic device dispensers are positioned in various locations throughout the city, enabling visitors to obtain a portable electronic device at their convenience. In some embodiments, the city and one or more businesses coordinate to distribute the portable electronic devices to the city users 78. For example, a city such as Las Vegas may coordinate with local hotels to provide portable electronic devices to guests staying at the respective hotels. As shown in this figure, the city-based facility mapping and visitor tracking system 70 includes a server computing device 22, a database server computing device 24, a plurality of wireless routers 26, and a plurality of areas 36. Depending on the geographical scope of the city-based facility mapping and visitor tracking system 70, it should be understood that the server computing device 22 can be one server computing device in a server bank comprising a plurality of server computing devices 22 that are coordinated to perform data load balancing and client conflict resolution. Likewise, the database server computing device 24 can be one database management system among a plurality of database server computing devices 24 that perform database management, data persistence, and data indexing for the city-based facility mapping and visitor tracking system 70.

Among the plurality of areas 36, each area 36 is associated with a wireless range of one of the wireless routers 26. In some city locations, a city user 78 with a portable electronic device can be present at a location within the wireless range of two or more wireless routers 26. When a city user 78 is in an area 36 or in two or more overlapping areas 36, the portable electronic device of the city user 78 transmits the present location to the wireless router 26 or routers 26 within the wireless communication range of the city user 78.

The wireless router(s) 26 then transmit the present location data of the city user 78 to the server 22, which subsequently computes map updates based on the present location data of the city user 78 and thereafter transmits the updated map data to the city user 78 by way of the router(s) 26. The server 22 also retrieves a variety of additional city-based data from the database 24. In some embodiments, the server 22 retrieves data about city attractions. Examples of city attractions include museums, historical sites, popular city destinations and venues, etc. In some embodiments, the server 22 retrieves data about businesses in the city. In some embodiments, the data about businesses in the city includes one or more of business advertising, business information, and business categories. In some embodiments, the server 22 retrieves data about city transportation and pathways, including roads, streets, walkways, parks, etc. In some embodiments, after the server 22 retrieves the city-based data from the database 24, the server 22 then transmits the city-based data to the city user 78 by way of the router(s) 26. Since the general location of the city user 78 is known by the area(s) 36 associated with the present location of the city user 78 (via router(s) 26), the server 22 can retrieve specific, targeted city-based information from the database 24, such as specific, targeted advertising, specific information on city attractions that may be of interest to the city user 78, or specific information about city transportation or pathways which may be suitable for the city user 78. In this way, the server 22 can deliver advertising data that relates directly to businesses or vendors proximate to the city user's present area(s) 36, city attraction information which is tailored to the interests of the city user 78, or city transportation or pathway information that would satisfy the needs of the city user 78. In addition, all of the city-based information can be provided to the city user 78 in real-time or near real-time, such that the city user 78 gets live updates of the city or the city area maps while walking, riding, driving, etc., and also receive advertising, attractions information, and other city-based information related to businesses/vendors, attractions, etc., that are nearby (or otherwise proximate to the city user 78). In some cases, the map displays supplementary data useful to the city user 78, including map displays of available parking spots, smart route logistical predictions, such as faster routes and transportation options for traveling to specific city locations, and/or need-based city information (e.g., handicapped accessible parking, attractions, dining, etc.).

V. Portable Multifunction Device

In some embodiments, the portable electronic device is multi-functional for use in facility mapping, visitor tracking, and authenticating access rights. In some embodiments, the portable multifunction device is used as a hotel door lock access device in addition to being a facility mapping and visitor tracking device.

Figure 13:
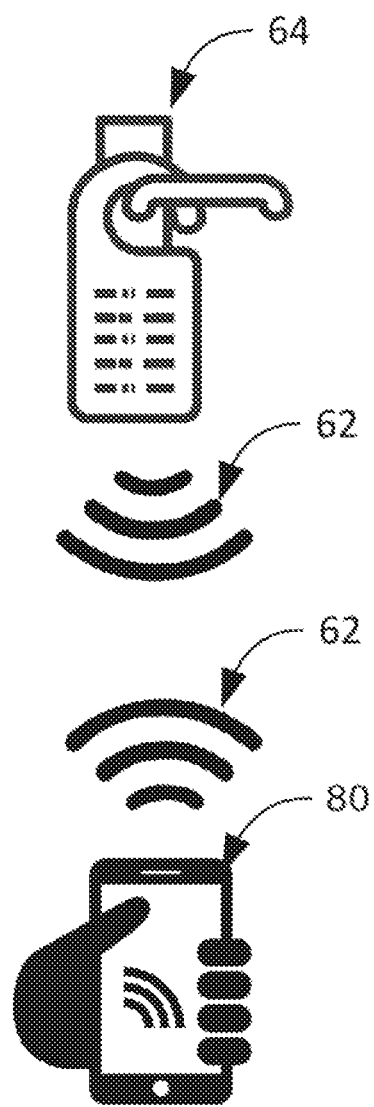
FIG. 13 conceptually illustrates a schematic view of a portable multifunction device that is configured for multifunctional use as a hotel door lock access device and as a facility mapping and visitor tracking device to be used in conjunction with a facility mapping and visitor system in some embodiments.

By way of example, FIG. 13 conceptually illustrates a schematic view of a portable multifunction device 80 that is configured for multi-functional use as a hotel door lock access device and as a facility mapping and visitor tracking device to be used in conjunction with a facility mapping and visitor system. As shown in this figure, the portable multifunction device 80 is configured to lock and unlock a hotel door lock 64 by way of a command transmitted wirelessly from the portable multifunction device 80 to the hotel door lock 64. In this example, the wireless transmission of command comprises a Bluetooth signal 62 that is sent by the portable multifunction device 80 and received by the hotel door lock 64. Thus, when a hotel visitor intends to enter his or her hotel room, the hotel visitor uses the portable multifunction device 80 to send an unlock authorization code to the hotel door lock 64. Similarly, when the hotel visitor intends to leave his or her hotel room, the portable multifunction device 80 receives a lock token by Bluetooth signal 62 sent from the hotel door lock 64. In some embodiments, the lock token received by the portable multifunction device 80 is a randomly generated, encrypted code of suitable complexity to withstand unauthorized hacking. For example, the hotel visitor may input a six-digit code from which a large hash code may be generated, such as a 128-bit, 256-bit, 512-bit, etc., hash code. The hash code may then be further encrypted by any of several encryption algorithms. In this way, if the hotel visitor loses the portable multifunction device 80, security access to the hotel room is nearly impossible to crack in real-time. On the other hand, the hotel visitor can safely enter and leave the hotel by the same input code every time he or she enters or leaves the hotel room, because a new hash can be generated from the same code every time. Thus, the hotel visitor can enter/exit his or her hotel room (and optional access hotel facilities with the portable multifunction device) and also use the portable multifunction device as a facility mapping and visitor tracking device, in any of the several example deployments described above, or in other manners.

Figure 14:
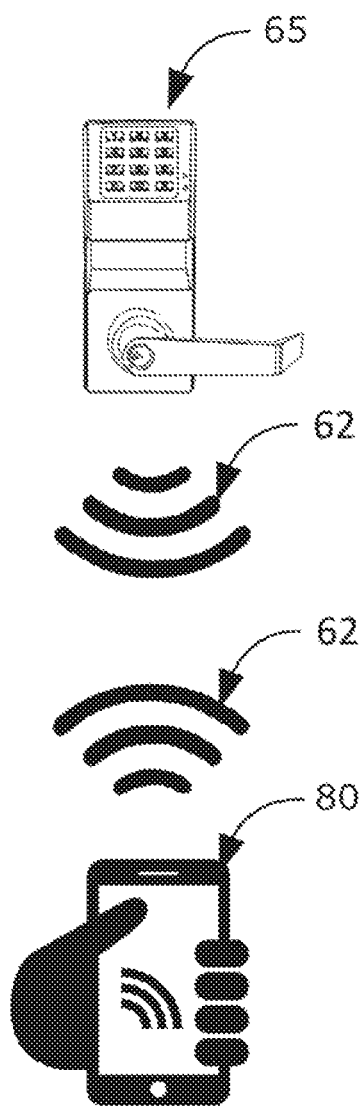
FIG. 14 conceptually illustrates a schematic view of a portable multifunction device that is configured for multifunctional use as a secure door keypad lock access device and as a facility mapping and visitor tracking device to be used in conjunction with a facility mapping and visitor system in some embodiments.

Turning to another example, FIG. 14 conceptually illustrates a schematic view of the portable multifunction device 80 configured for multi-functional use as a secure door keypad lock 65 access device and as a facility mapping and visitor tracking device to be used in conjunction with a facility mapping and visitor system. Similar to the portable multifunction device 80 described above by reference to FIG. 13, the portable multifunction device 80 shown in this figure can be used for locking and unlocking any secure keypad-based door lock. For example, a closet, a room, a privileged access area, etc., can all be unlocked/locked by the portable multifunction device 80, thereby allowing an authenticated user to access equipment, documents, information systems, conference exhibits, special production facilities, etc., while simultaneously performing facility mapping and visitor tracking in any of the several example deployments of the facility mapping and visitor tracking system described above. Also, for the keypad-based secure door lock, the user can manually enter a code to gain access. For example, the systems administrator can enter a code manually by pressing the key pad numbers (e.g., a six or eight digit access code) and gain access to a computer and network systems room, but the systems administrator can then reset the code to any other code (e.g., of six or eight digits) with encryption happening based on a hash of the code for each subsequent exit/entry.

The different type of door lock in this figure, compared to the secure door lock shown in FIG. 13, provides an example of how the portable multifunction device 80 can be used in any of several scenarios, beyond merely a hotel setting. While the example door lock in this figure illustrates a keypad-type lock, a person skilled in the relevant art would appreciate that the portable multifunction device 80 can be used with key card door locks, or other magnetic stripe-based secure door lock access systems. Furthermore, the portable multifunction device 80 can be configured to interact wirelessly (e.g., via Bluetooth) with multiple different types of secure door lock access systems, all while continuing to perform facility mapping and visitor tracking in any of the several contexts noted above (e.g., facility, parking structure, military base and other high security zones, amusement parks, stadiums, and other large entertainment venues, cities, towns, and other municipalities, etc.).

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. For example, many of the features are described in relation to a facility, in general, or any of several other specific deployments including, without limitation, a parking facility, a single encapsulated facility, a high security facility (such as a military base), a park facility (such as an amusement park), a city or city area, etc. Whether in general deployment or specific deployment, therefore, the present disclosure generally works in relation to any type of facility or area. For example, embodiments of the portable electronic device can be implemented for use in a wide area in which a central server provides a wide area map to the portable electronic device, allowing a user of the device to explore the wide area and interact with the device to find out information about specific entities in the wide area. An example of a wide area is a municipality or urban region (e.g., downtown area of a city). In such a situation, the central server could provide a municipality or urban region map to a portable electronic device of a visitor to a particular city. Features may include the ability to discover hotels, restaurants, night life entertainment, commercial businesses, museums, parks, etc., in the particular city and make payments, reserve tables or seats, add credits to parking spots, etc., all with the portable electronic device. Thus, one of ordinary skill in the art would understand that the invention is not to be limited by the foregoing illustrative details, but rather is to be defined by the appended claims.

VI. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs. Many of the above-described features and applications are implemented with a portable electronic device, such as any of the portable electronic devices described by reference to FIGS. 1-4.

Figure 15:
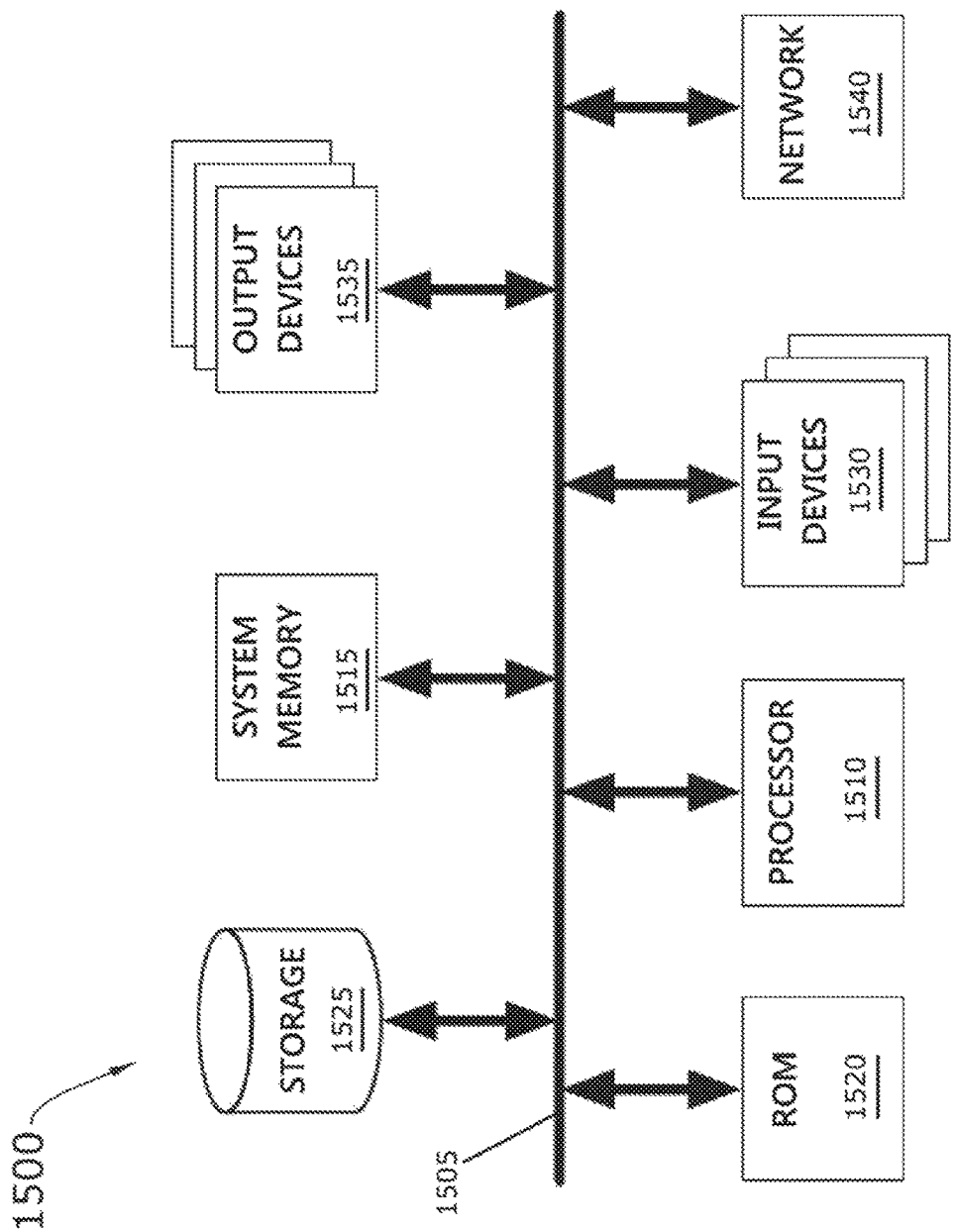
FIG. 15 conceptually illustrates an electronic system with which some embodiments of the invention are implemented.

FIG. 15 conceptually illustrates an electronic system 1500 with which some embodiments of the invention are implemented. The electronic system 1500 may be a computer, phone, PDA, or any other sort of electronic device. Such an electronic system includes various types of computer readable media and interfaces for various other types of computer readable media. Electronic system 1500 includes a bus 1505, processing unit(s) 1510, a system memory 1515, a read-only 1520, a permanent storage device 1525, input devices 1530, output devices 1535, and a network 1540.

The bus 1505 collectively represents all system, peripheral, and chipset buses that communicatively connect the numerous internal devices of the electronic system 1500. For instance, the bus 1505 communicatively connects the processing unit(s) 1510 with the read-only 1520, the system memory 1515, and the permanent storage device 1525.

From these various memory units, the processing unit(s) 1510 retrieves instructions to execute and data to process in order to execute the processes of the invention. The processing unit(s) may be a single processor or a multi-core processor in different embodiments.

The read-only-memory (ROM) 1520 stores static data and instructions that are needed by the processing unit(s) 1510 and other modules of the electronic system. The permanent storage device 1525, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1525.

Other embodiments use a removable storage device (such as a floppy disk or a flash drive) as the permanent storage device 1525. Like the permanent storage device 1525, the system memory 1515 is a read-and-write memory device. However, unlike storage device 1525, the system memory 1515 is a volatile read-and-write memory, such as a random access memory. The system memory 1515 stores some of the instructions and data that the processor needs at runtime. In some embodiments, the invention's processes are stored in the system memory 1515, the permanent storage device 1525, and/or the read-only 1520. For example, the various memory units include instructions for processing appearance alterations of displayable characters in accordance with some embodiments. From these various memory units, the processing unit(s) 1510 retrieves instructions to execute and data to process in order to execute the processes of some embodiments.

The bus 1505 also connects to the input and output devices 1530 and 1535. The input devices enable the user to communicate information and select commands to the electronic system. The input devices 1530 include alphanumeric keyboards and pointing devices (also called "cursor control devices"). The output devices 1535 display images generated by the electronic system 1500. The output devices 1535 include printers and display devices, such as cathode ray tubes (CRT) or liquid crystal displays (LCD). Some embodiments include devices such as a touchscreen that functions as both input and output devices.

Finally, as shown in FIG. 15, bus 1505 also couples electronic system 1500 to a network 1540 through a network adapter (not shown). In this manner, the computer can be a part of a network of computers (such as a local area network ("LAN"), a wide area network ("WAN"), or an intranet), or a network of networks (such as the Internet). Any or all components of electronic system 1500 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 7-9 conceptually illustrate processes in which the specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. A city-based facility mapping and visitor tracking system that tracks a location of a city visitor within a city to display a city map and deliver targeted area-specific advertising to the city visitor based on the location of the city visitor, said city-based facility mapping and visitor tracking system comprising:

a database management system that stores advertising data associated with a plurality of businesses within the city;

a plurality of areas of the city, wherein each area in the plurality of areas is defined by a perimeter that surrounds the area, wherein each area in the plurality of areas includes a set of businesses that are located within the perimeter that surrounds the area;

a plurality of wireless communication devices, wherein each wireless communication device in the plurality of wireless communication devices is located within a corresponding area of the plurality of areas and provides wireless communication over a wireless communication range of the corresponding area defined by the perimeter that surrounds the corresponding area;

a plurality of portable electronic devices dispensed to a plurality of city visitors to provide city map views of the city and deliver targeted advertising to each city visitor, wherein each city visitor is dispensed a portable electronic device at one of a plurality of portable electronic device dispensers, wherein a particular portable electronic device is configured to connect wirelessly to a particular wireless communication device based on a location of a particular city visitor, wherein the location of the particular city visitor is within the corresponding wireless communication range associated with the particular area, wherein the particular portable electronic device is configured to receive a particular city map view from the particular wireless communication device and to display the particular city map view on a screen of the particular portable electronic device while the particular city visitor is located within the wireless communication range corresponding to the particular area, wherein the particular portable electronic device is configured to update the city map view displayed on the screen in real-time as the location of the particular city visitor changes from the wireless communication range corresponding to the particular area to a different wireless communication range corresponding to a different wireless communication device, wherein targeted advertisements are displayed on the portable electronic device dispensed to each visitor; and a central server that generates a unique identifier (UID) to associate with identifying information about each city visitor and a unique hardware identifier of each portable electronic device dispensed to each city visitor, wherein the central server is configured to transmit city map views to the portable electronic device based on the location of each city visitor.

2. The city-based facility mapping and visitor tracking system of claim 1, wherein the plurality of portable electronic device dispensers comprises a public roadside device dispenser that is a stationed at one of a sidewalk, an intersection of streets, and a public community area.

3. The city-based facility mapping and visitor tracking system of claim 1, wherein the plurality of portable electronic device dispensers comprises a private portable multifunction device dispenser that is a stationed at one of a hotel, a conference facility, an exhibition facility, and a business facility.

4. The city-based facility mapping and visitor tracking system of claim 1, wherein the database management system that stores advertising data associated with the plurality of businesses within the city further stores area location data for each business that indicates the area in which the business is located within the plurality of areas of the city.

5. The city-based facility mapping and visitor tracking system of claim 4, wherein the central server further identifies each city visitor by a set of user credentials the city visitor inputs into the portable electronic device when the portable electronic device is dispensed to the city visitor, wherein the identifying information about the city visitor comprises the set of user credentials, wherein the central server transmits the targeted advertisements based on the identified city visitor using the portable electronic device.

6. A military base facility mapping and visitor tracking system that tracks a location of a user at a military base to display a military base map suitable to an access level of the user based on an authorization level of a portable electronic device of the user, said military base facility mapping and visitor tracking system comprising:

a general area of the military base comprising a set of general visibility military facilities that displayed on the portable electronic device of the user when the user is physically present with a perimeter that surrounds the general area;

a high security area of the military base comprising a set of restricted access military facilities that is different from the set of general visibility military facilities, wherein the set of restricted access military facilities are displayed on the portable electronic device of the user when the user is authorized to see the set of restricted access military facilities and the user is physically present within a high security perimeter that surrounds the high security area;

a portable electronic device that includes an authorization level associated with the user, said authorization level defining military base visibility permissions for displaying military facilities in the general area and the high security area; and a portable electronic device dispenser that is physically positioned at an entry point of the military base to dispense portable electronic devices to visitors entering the military base and receive returned portable electronic devices from visitors leaving the military base.

7. The military base facility mapping and visitor tracking system of claim 6, wherein the general area and the restricted area do not overlap.

8. An amusement park facility mapping and visitor tracking system that tracks a location of an amusement park visitor at an amusement park to display an amusement park map, deliver amusement park attraction information to the amusement park visitor based on the location of the amusement park visitor, and deliver targeted area-specific advertising to the amusement park visitor based on the location of the amusement park visitor, said amusement park facility mapping and visitor tracking system comprising:

a plurality of areas of the amusement park, wherein each area in the plurality of areas is defined by a perimeter that surrounds the area, wherein each area in the plurality of areas includes at least one of an amusement park attraction and an amusement park vendor located within the perimeter that surrounds the area;

a plurality of wireless communication devices, wherein each wireless communication device in the plurality of wireless communication devices is located within one area of the plurality of areas that is different from the area in which each other wireless communication device is located, wherein each wireless communication device in the plurality of wireless communication devices defines a wireless communication range associated with an area in the plurality of areas of the amusement park;

a portable electronic device dispenser that is physically positioned at an entry point of the amusement park to dispense portable electronic devices to amusement park visitors entering the amusement park and receive returned portable electronic devices from amusement park visitors leaving the amusement park; and a portable electronic device dispensed from the portable electronic device dispenser to the amusement park visitor to visually output amusement park map views of one or more areas of the amusement park based on the location of the amusement park visitor and to deliver amusement park attraction information and vendor advertising to the amusement park visitor based on the location of the amusement park visitor, wherein the portable electronic device is configured to connect wirelessly to particular wireless communication device located in a particular area when the amusement park visitor is located within a particular wireless communication range associated with the particular area, wherein the portable electronic device is configured to receive a particular amusement park area map view from the particular wireless communication device and to visually output the particular amusement park area map view on a screen of the portable electronic device while the amusement park visitor is located within the particular wireless communication range associated with the particular area, wherein the portable electronic device is configured to update the amusement park map views visually output to the screen in real-time as the location of the amusement park visitor changes from the particular wireless communication range associated with the particular area to a different wireless communication range associated with a different wireless communication device that is located in a different area of the amusement park.

9. The amusement park facility mapping and visitor tracking system of claim 8, wherein each wireless communication range overlaps with at least one other wireless communication range.

* * * * *